US012742744B2

(12) United States Patent
Tahara et al.

(10) Patent No.: US 12,742,744 B2
(45) Date of Patent: Sep. 22, 2026

(54) METHOD FOR EVALUATING CATHODE SLURRY FOR ALL-SOLID-STATE BATTERY

(71) Applicant: HONDA MOTOR CO., LTD., Tokyo (JP)

(72) Inventors: Sayaka Tahara, Wako (JP); Tsutomu Kameyama, Wako (JP); Mayuko Ogasawara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 18/735,225

(22) Filed: Jun. 6, 2024

(65) Prior Publication Data

US 2024/0410847 A1 Dec. 12, 2024

(30) Foreign Application Priority Data

Jun. 8, 2023 (JP) ................................ 2023-094676

(51) Int. Cl.
*G01N 27/02* (2006.01)
*H01M 4/04* (2006.01)
*H01M 4/02* (2006.01)

(52) U.S. Cl.
CPC ............ *G01N 27/023* (2013.01); *H01M 4/04* (2013.01); *H01M 2004/028* (2013.01)

(58) Field of Classification Search
None
See application file for complete search history.

(56) References Cited

U.S. PATENT DOCUMENTS

2022/0042897 A1* 2/2022 Kawamuro ............ G01N 15/04
2025/0015268 A1 1/2025 Imazaki et al.

FOREIGN PATENT DOCUMENTS

JP 2005-259512 9/2005
JP 5505318 5/2014
JP 2015-222651 12/2015
WO 2023/063303 4/2023

OTHER PUBLICATIONS

Japanese Office Action for Japanese Patent Application No. 2023-094676 mailed Apr. 1, 2025.

* cited by examiner

*Primary Examiner* — Jas A Sanghera
(74) *Attorney, Agent, or Firm* — Amin, Turocy & Watson, LLP

(57) ABSTRACT

A method for evaluating a cathode slurry for an all-solid-state battery, comprising: measuring an alternating current impedance with respect to a cathode slurry for an all-solid-state battery, in which a cathode active material, a solid electrolyte, a conductive agent and a binder are kneaded and dispersed, and which is sealed in a measurement container provided with electrodes at both ends thereof, identifying a frequency range from data of the measured alternating current impedance; and evaluating quality of coating condition of the solid electrolyte on the cathode active material, based on an imaginary axis parameter of the alternating current impedance in the identified frequency range and a real axis parameter of the alternating current impedance in the identified frequency range.

4 Claims, 2 Drawing Sheets

SLURRY PREPARATION — S1
IMPEDANCE MEASUREMENT — S2
FREQUENCY RANGE IDENTIFICATION — S3
EVALUATION OF COATING CONDITION — S4

METHOD FOR EVALUATING CATHODE SLURRY FOR ALL-SOLID-STATE BATTERY

CROSS-REFERENCE TO RELATED APPLICATION

Priority is claimed on Japanese Patent Application No. 2023-094676, filed Jun. 8, 2023, the contents of which are incorporated herein by reference.

BACKGROUND OF THE INVENTION

Field of the Invention

The present invention relates to a method for accurately evaluating the quality of a slurry for a cathode for an all-solid-state battery, comprising an active material, a solid electrolyte, a conductive agent, a binder material, etc., while allowing the slurry to remain in a state of slurry.

Description of Related Art

In the production of electrode slurries used in liquid electrolyte lithium ion batteries and all-solid lithium ion batteries, the quality of the electrode slurries is generally controlled by evaluating rheology such as viscosity. Further, as a quality control method for electrode slurries, for example, a technique is known in which the quality of electrode slurries is determined by extracting the electrode slurry immediately after production and measuring the alternating current impedance of the electrode slurry. Furthermore, one example of a method for evaluating the quality of cathode slurries for all-solid-state lithium ion batteries is a method that evaluates the coating condition of a coating material on the electrode active material.

Japanese Unexamined Patent Application Publication No. 2015-222651 describes a method for producing a paste including an active material, a solid electrolyte and a conductive agent, which comprises: a measurement step for measuring alternating current impedance of a paste corresponding to a predetermined measurement frequency band; a composition ratio determination step for making determination on whether or not the composition ratio of the paste is out of a predetermined range based on the width of an arc part corresponding to a predetermined frequency band in a real part direction in a trace drawn on a complex impedance plane by the measured alternating current impedance; and a removal step for removing the paste if the composition ratio of the paste is determined to be out of the predetermined range.

Japanese Patent No. 5505318 describes a paste evaluation method for evaluating paste applied to battery electrode surfaces, which uses a container having a rotation mechanism and a measurement part which measures alternating current impedance of the paste, wherein the alternating current impedance of the paste is measured by the measurement part while rotating the paste stored in the container by the rotation mechanism, and the measurement part has a pair of application electrode boards arranged in parallel with each other in order to apply alternating voltage to the paste, and averages a measurement value of the alternating current impedance for one rotation or more by the rotation mechanism to correct a measurement error to be generated from a parallelism error of the pair of application electrode boards.

SUMMARY OF THE INVENTION

A cathode slurry for all-solid-state batteries uses more materials than the counterpart of liquid electrolyte lithiumion batteries, and also contains a composite element formed between the active material and the solid electrolyte, where the composite of the solid electrolyte in the cathode active material (being coated) is considered to greatly contribute to battery performance. However, no specific method has been found for evaluating the coating condition of the solid electrolyte on the cathode active material with respect to a slurry, and it has been difficult to accurately evaluate the coating condition.

In order to solve the above problems, the purpose of the present invention is to accurately evaluate the coating condition of a solid electrolyte on a cathode active material with respect to a slurry for an all-solid-state battery, and to stabilize battery performance, improve quality control in the manufacturing process. This in turn contributes to energy efficiency.

[1] A method for evaluating a cathode slurry for an all-solid-state battery, comprising: measuring an alternating current impedance with respect to a cathode slurry for an all-solid-state battery, in which a cathode active material, a solid electrolyte, a conductive agent and a binder are kneaded and dispersed, and which is sealed in a measurement container provided with electrodes at both ends thereof;

- identifying a frequency range from data of the measured alternating current impedance; and
- evaluating quality of coating condition of the solid electrolyte on the cathode active material, based on an imaginary axis parameter of the alternating current impedance in the identified frequency range and a real axis parameter of the alternating current impedance in the identified frequency range.

By the method for evaluating a cathode slurry for an all-solid-state battery according to the present invention, evaluation of the coating condition of a solid electrolyte on a cathode active material can be implemented with high accuracy, based on an imaginary axis parameter of the alternating current impedance in a specific frequency range and a real axis parameter of the alternating current impedance in a specific frequency range, which are derived from the alternating current impedance measured with respect to the cathode slurry for an all-solid-state battery.

[2] The method according to [1], wherein the imaginary axis parameter of the alternating current impedance is an imaginary component (Zim) of the alternating current impedance of the cathode slurry, or a polarization charge (Cp) derived from the imaginary component (Zim).

By the method for evaluating a cathode slurry for an all-solid-state battery according to the present invention, evaluation of the coating condition of a solid electrolyte on a cathode active material can be implemented with high accuracy due to the use of an imaginary component (Zim) of the alternating current impedance or a polarization charge (Cp) derived from the imaginary component (Zim) as the imaginary axis parameter of the alternating current impedance.

[3] The method according to [1] or [2], wherein the real axis parameter of the alternating current impedance is a real number component (Zre) of the alternating current impedance of the cathode slurry.

By the method for evaluating a cathode slurry for an all-solid-state battery according to the present invention, the dispersion state of a cathode slurry for an all-solid-state battery can be evaluated with high accuracy due to the use of a real number component (Zre) of the alternating current impedance of the cathode slurry as the real axis parameter of the alternating current impedance.

[4] The method according to any one of [1] to [3], wherein, for identifying the frequency range, the alternating current impedance of the cathode slurry is divided into two or more frequency ranges.

By the method for evaluating a cathode slurry for an all-solid-state battery according to the present invention, evaluation of the coating condition of a solid electrolyte on a cathode active material can be implemented with high accuracy, because the evaluation is made with the alternating current impedance of the cathode slurry divided into two or more frequency ranges.

[5] The method according to any one of [1] to [4], wherein the quality of coating condition is evaluated based on one or both of the polarization charge (Cp) derived from the imaginary component (Zim) of the alternating current impedance obtained at identified different frequencies, and the real number component (Zre) of the alternating current impedance.

By the method for evaluating a cathode slurry for an all-solid-state battery according to the present invention, evaluation of the coating condition of a solid electrolyte on a cathode active material can be implemented with even higher accuracy, because the evaluation is made with a combination of the imaginary axis parameter of the alternating current impedance obtained by dividing the alternating current impedance of the cathode slurry for an all-solid-state battery into two or more frequency ranges, and the real axis parameter of the alternating current impedance.

By an embodiment of the present invention, evaluation of the coating condition of a solid electrolyte on a cathode active material can be implemented with high accuracy with respect to a cathode slurry for an all-solid-state battery.

DETAILED DESCRIPTION OF THE INVENTION

Hereinbelow, the embodiments of the present invention are described in detail.

[Method for Evaluating Cathode Slurry for all-Solid-State Battery]

The method for evaluating a cathode slurry for an all-solid-state battery according to an embodiment of the present invention, comprises: measuring an alternating current impedance with respect to a cathode slurry for an all-solid-state battery, in which a cathode active material, a solid electrolyte, a conductive agent and a binder are kneaded and dispersed, and which is sealed in a measurement container provided with electrodes at both ends thereof, identifying a frequency range from data of the measured alternating current impedance; and evaluating quality of coating condition of the solid electrolyte on the cathode active material, based on an imaginary axis parameter of the alternating current impedance in the identified frequency range and a real axis parameter of the alternating current impedance in the identified frequency range.

The method for evaluating a cathode slurry for an all-solid-state battery according to the present embodiment may include a step of preparing the cathode slurry for an all-solid-state battery to be evaluated by the method for evaluating a cathode slurry for an all-solid-state battery according to the present embodiment.

Figure 1:
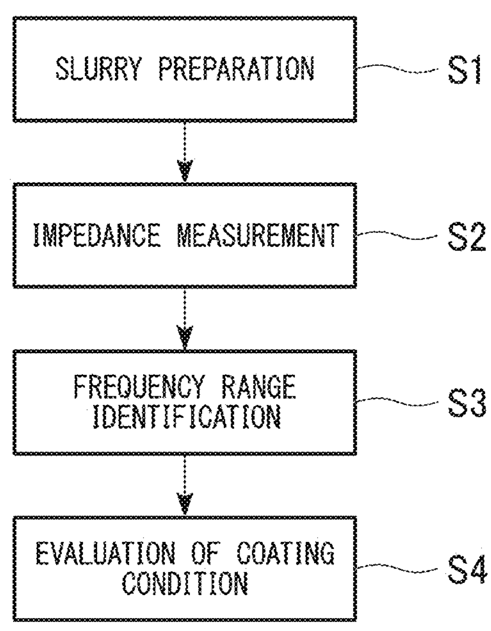
FIG. 1 is a flowchart showing a method for evaluating a cathode slurry for an all-solid-state battery according to the present embodiment.

FIG. 1 is a flowchart showing the method for evaluating a cathode slurry for an all-solid-state battery according to the present embodiment.

<Preparation Step>

In the method for evaluating a cathode slurry for an all-solid-state battery according to the present embodiment, the cathode slurry for an all-solid-state battery prepared in the preparation step (S1 shown in FIG. 1) is evaluated.

With respect to the cathode slurry for an all-solid-state battery, which is subjected to quality control by the method for a cathode slurry for an all-solid-state battery according to the present embodiment, the cathode slurry includes a cathode active material, a solid electrolyte, a conductive agent, and a binder.

The cathode active material is not particularly limited as long as it is a material that can reversibly occlude and release lithium ions and can transport electrons, and any known cathode active material that can be used in cathodes of all-solid-state lithium ion batteries may be used. Examples thereof include lithium composite oxides, such as cobalt oxide ($LiCoO_2$), lithium nickel oxide ($LiNiO_2$), lithium manganese oxide ($LiMn_2O_4$), solid solution oxide ($Li_2MnO_3$—$LiMO_2$ (M=Co, Ni, etc.)), lithium-manganese-nickel-cobalt oxide ($LiNi_xMn_yCo_zO_2$, x+y+z=1), and olivine-type lithium phosphate ($LiFePO_4$); conductive polymers, such as polyaniline and polypyrrole; sulfides, such as $Li_2S$, CuS, Li—Cu—S compound, $TiS_2$, FeS, $MoS_2$, and Li—Mo—S compound; and mixtures of sulfur and carbon. The cathode active material may be composed of one kind of the above-mentioned materials alone, or may be composed of two or more kinds of the materials.

The solid electrolyte is not particularly limited as long as it has lithium ion conductivity and is electrically insulative, and materials generally used in all-solid-state lithium ion batteries can be used. Examples thereof include inorganic solid electrolytes, such as sulfide solid electrolyte materials, oxide solid electrolyte materials, halide solid electrolytes; polymer solid electrolytes, such as polyethylene oxide; gel-type solid electrolytes containing lithium-containing salts or lithium ion conductive ionic liquids. Among these, sulfide solid electrolyte materials are preferred in terms of high lithium ion conductivity, and good structural formability and good interfacial bonding that are exhibited when the materials are pressed. The form of the solid electrolyte material is not particularly limited, and the solid electrolyte material may be in the form of particles, for example.

The cathode slurry for an all-solid-state battery may contain a conductive agent in terms of improving the conductivity of the cathode. As the conductive agent, a conductive agent that can generally be used in all-solid-state lithium ion batteries can be used. Examples thereof include carbon materials, for example, carbon black, such as acetylene black and Ketjen black; carbon fiber; vapor grown carbon fiber; graphite powder; carbon nanotubes. The conductive agent may be composed of one kind of the above-mentioned materials alone, or may be composed of two or more kinds of the materials.

The cathode slurry for an all-solid-state battery may contain a solvent in terms of adjusting viscosity.

The cathode slurry for an all-solid-state battery can be prepared by mixing a cathode active material, a solid electrolyte, a conductive agent, and a binder in a predetermined mixing ratio, and then kneading the resulting mixture containing the cathode active material, solid electrolyte, conductive agent, and binder with a kneader.

<Measurement Step>

In the measurement step, the cathode slurry for an all-solid-state battery is placed between two electrodes, and an alternating voltage or alternating current is applied between the two electrodes to measure the alternating current impedance of the cathode slurry for an all-solid-state battery (S2 shown in FIG. 1).

In the method for evaluating a cathode slurry for an all-solid-state battery according to the present embodiment, the frequency of the alternating voltage or the alternating current used to measure the alternating current impedance of the cathode slurry for an all-solid-state battery is continuously changed, for example, from 5 MHz to 1 Hz.

<Frequency Range Identification Step>

In the frequency range identification step, an alternating frequency range to be used for evaluating the coating condition of the solid electrolyte on the cathode active material is identified from the alternating current impedance measurement data obtained in the measurement step (S3 shown in FIG. 1).

In the method of the present invention, evaluation of the coating condition of the solid electrolyte on the cathode active material can be implemented with high accuracy by using an imaginary axis parameter of the alternating current impedance in the identified frequency range and a real axis parameter of the alternating current impedance in the identified frequency range, among the alternating current impedance measurement data acquired in the measurement step. For example, a range of 5 kHz to 50 kHz, a range of 100 Hz to 1 kHz, a range of 5 Hz to 20 Hz, or the like, is selected as the alternating frequency range used for evaluating the coating condition.

The imaginary axis parameter of the alternating current impedance of the cathode slurry for an all-solid-state battery is preferably an imaginary component (Zim) of the alternating current impedance or a polarization charge (Cp) derived from the imaginary component (Zim). Explanations are given below on the method for identifying the imaginary component (Zim) or the polarization charge (Cp), which are used in the evaluation of coating condition. With respect to the imaginary component (Zim) of the alternating current impedance or the polarization charge (Cp) derived from the imaginary component (Zim) of the alternating current impedance in the alternating frequency range of 5 Hz to 20 Hz, the imaginary component (Zim) or the polarization charge (Cp) at the frequency where the largest change is observed, depending on the type of the cathode slurry for an all-solid-state battery as the measurement target, is defined as the imaginary axis parameter used to evaluate the coating condition. The frequency at which this imaginary axis parameter changes significantly varies depending on the material of the active material, etc., but for example, by evaluating samples in which the load intensity in the step of carrying out solid electrolyte coating on the active material for an all-solid-state battery is changed, it is possible to identify the frequency at which the imaginary axis parameter changes significantly. In the case of the cathode slurry for an all-solid-state battery in the Example, the frequency at which the imaginary component (Zim) or the polarization charge (Cp) changes the most is, for example, 10 Hz.

The real axis parameter of the alternating current impedance of the cathode slurry for an all-solid-state battery is preferably a real number component (Zre) of the alternating current impedance of the cathode slurry for an all-solid-state battery. An explanation is given below on the method for identifying the frequency range of the real number component (Zre) used for evaluating the coating condition.

Figure 2:
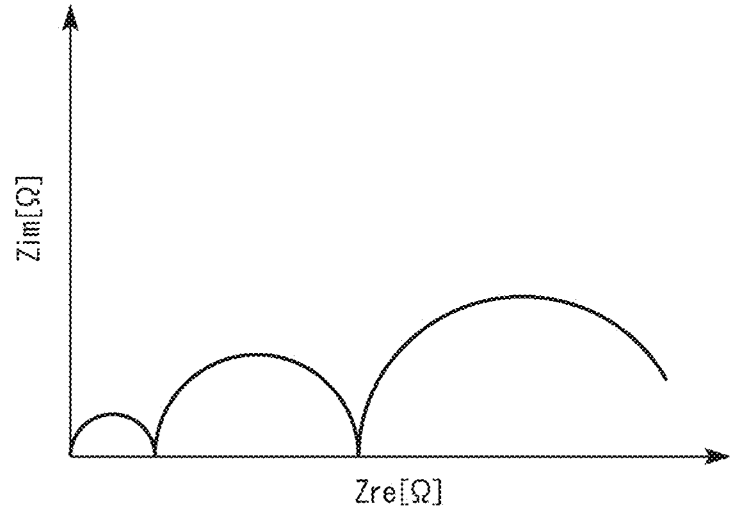
FIG. 2 is a diagram showing an example of Nyquist plot showing the result of alternating current impedance measurement of a cathode slurry for an all-solid-state battery.

The alternating current impedance data acquired in the measurement step is divided into the real component (Zre) on the abscissa and an imaginary component (Zim) on the ordinate, and displayed on a complex plane (Nyquist plot). FIG. 2 is a diagram showing an example of a Nyquist plot of the alternating current impedance measurement of the cathode slurry for an all-solid-state battery, which is acquired in the measurement step. As shown in FIG. 2, the Nyquist plot of the cathode slurry for an all-solid-state battery theoretically has three arcuate portions. However, the first arcuate portion in the real part direction is difficult to obtain with measuring instruments currently available in general. In FIG. 2, the frequency at the boundary between the second arcuate portion and the third arcuate portion as viewed from the low impedance side to the real part is defined as the frequency of the real component (Zre) used for evaluating the coating condition.

The second arcuate portion is an arcuate portion corresponding to a frequency range from 1 kHz to 1 MHz, and the third arcuate portion is an arcuate portion corresponding to a frequency range from 5 Hz to 1 kHz.

<Step of Evaluating Coating Condition of the Solid Electrolyte on the Cathode Active Material>

In the step of evaluating the coating condition of the solid electrolyte on the cathode active material (hereinafter referred to as "evaluation step"), the coating condition of the solid electrolyte on the cathode active material is evaluated, based on the imaginary axis parameter of the alternating current impedance and the real axis parameter of the alternating current impedance in the frequency range identified in the frequency range identification step, among the alternating current impedance measurement data acquired in the measurement step for the cathode slurry for an all-solid-state battery (S4 shown in FIG. 1).

The cathode slurry for an all-solid-state battery is judged to be one capable of providing good coating condition of a solid electrolyte on a cathode active material when the imaginary axis parameter of the alternating current impedance in the frequency range identified in the frequency range identification step satisfies a threshold value predetermined from the alternating current impedance measurement data acquired in advance with respect to a cathode slurry (for an all-solid-state battery) capable of providing good coating condition of a solid electrolyte on a cathode active material (hereinafter referred to as "good slurry"), and the real axis parameter of the alternating current impedance in the frequency range identified in the frequency range identification step satisfies a threshold value predetermined from the alternating current impedance measurement data acquired in advance with respect to a good slurry. The threshold value is determined from the alternating current impedance measurement results acquired for a slurry judged to be a good slurry, for example, based on the battery performance, the dispersion state of the slurry determined using an analytical means such as a particle size distribution analyzer, the coating thickness of the solid electrolyte calculated using an analytical means such as an electron microscope, etc. The upper limit and lower limit of the threshold value are determined depending on the type of cathode slurry for an all-solid-state battery.

The cathode slurry for an all-solid-state battery is judged to be one with inferior coating condition of a solid electrolyte on a cathode active material when the imaginary axis parameter of the alternating current impedance in the frequency range identified in the frequency range identification step does not satisfy a threshold value predetermined from the alternating current impedance measurement data acquired in advance with respect to a good slurry, and/or the real axis parameter of the alternating current impedance in the frequency range identified in the frequency range identification step does not satisfy a threshold value predetermined from the alternating current impedance measurement data acquired in advance with respect to a good slurry.

By the method for evaluating a cathode slurry for an all-solid-state battery according to the present embodiment, evaluation of the coating condition of a solid electrolyte on a cathode active material can be implemented with high accuracy by measuring an alternating current impedance with respect to a cathode slurry for an all-solid-state battery in a specific frequency range, and carrying out evaluation based on the obtained imaginary axis parameter of the alternating current impedance and real axis parameter of the alternating current impedance.

EXAMPLES

Hereinbelow, the present invention will be described with reference to Examples which, however, should not be construed as limiting the present invention.

Example 1

<Preparation of Cathode Slurry for all-Solid-State Battery>

In order to vary the coating condition of the cathode active material, composite materials were prepared in advance while varying the treatment conditions in four patterns in the solid electrolyte coating step. The four patterns were set to vary from low to high processing load conditions.

Then, a cathode slurry for an all-solid-state battery was prepared as follows.

A binder solution and a conductive agent dispersion were stirred and mixed for 1 minute at 2000 rpm using a rotation-revolution mixer (kneader) to obtain a mixture 1.

To the obtained mixture 1, zirconia balls with a diameter of 2 mm, a cathode active material (which had been coated with solid electrolyte, and had a cathode active material/solid electrolyte ratio of, for example, 75:25 to 90:10 (mass ratio)), and a solvent (butyl butyrate) were added, and the resulting was stirred and mixed at 2000 rpm for 1 minute to obtain a mixture 2.

A solid electrolyte and a solvent (butyl butyrate) were added to the obtained mixture 2, and the resulting mixture was kneaded for 1 minute at 2000 rpm using a kneader to obtain a mixture 3.

A diluent solvent (butyl butyrate) was added to the obtained mixture 3, and the resulting mixture was stirred and mixed at 2000 rpm for 2 minutes to obtain a mixture 4. Thereafter, a step of kneading was performed while repeatedly diluting the mixture.

<Impedance Measurement: Imaginary Component (Cp)>

Figure 3:
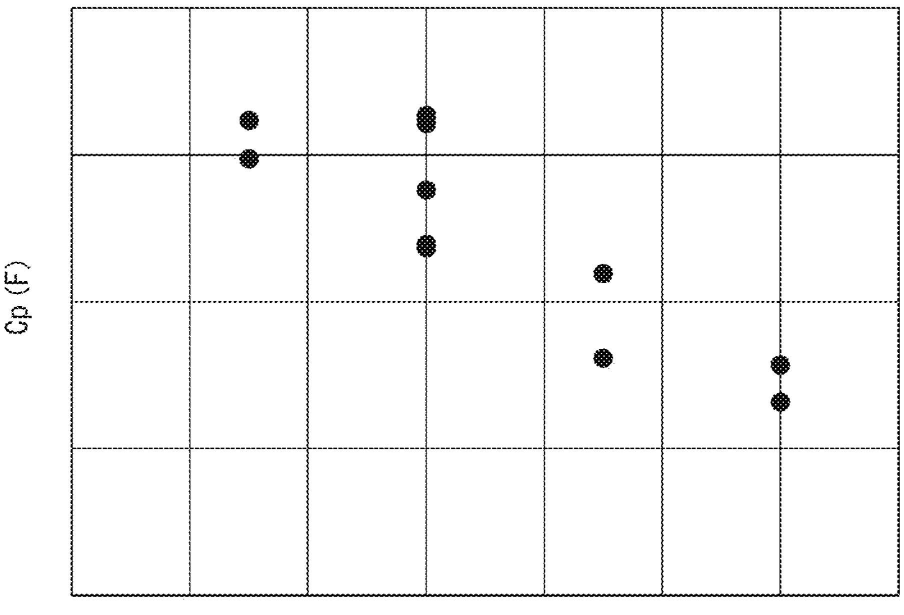
FIG. 3 is a diagram showing the relationship between the load intensity and the polarization charge (Cp) in the step of carrying out solid electrolyte coating on the active material for an all-solid-state battery in Example 1.

The alternating current impedance of the cathode slurries for an all-solid-state battery obtained while varying the treatment conditions was measured, and the polarization charge (Cp) derived from the parameter (Zim) of the imaginary axis of the alternating current impedance was calculated, and the relationship between load intensity conditions and polarization charge (Cp) was investigated. The results are shown in FIG. 3. From the results shown in FIG. 3, it was found that the load intensity and the polarization charge (Cp) showed a proportional relationship where the larger the load intensity, the smaller the polarization charge (Cp). This shows that, as the load intensity increases, the coating of the active material with the solid electrolyte progresses, and the exposed surface area of the cathode active material becomes smaller, resulting in good coating of the solid electrolyte in terms of particle conditions.

<Impedance Measurement: Real Component (Zre)>

Figure 4:
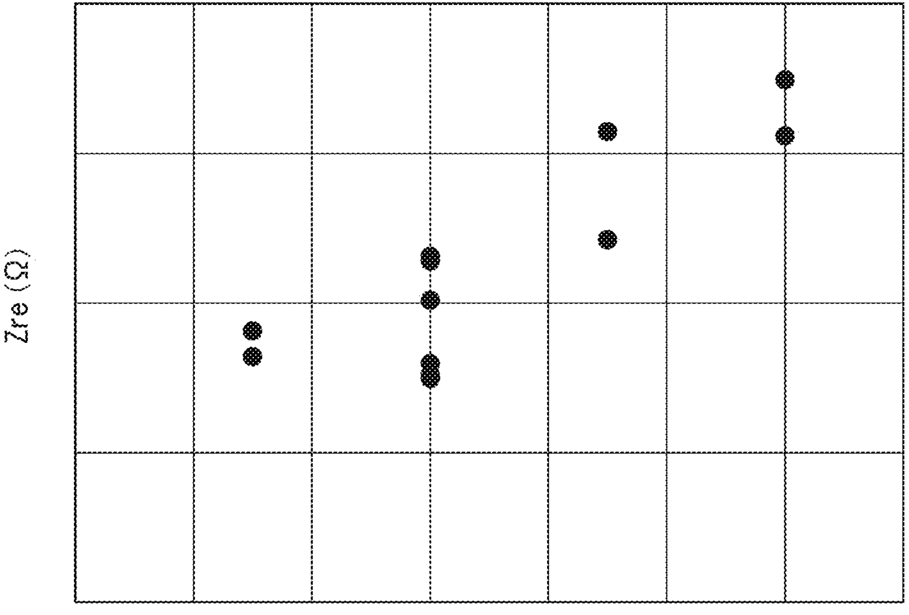
FIG. 4 is a diagram showing the relationship between the load intensity and the real component (Zre) in the step of carrying out solid electrolyte coating on the active material for an all-solid-state battery in Example 1.

The real component (Zre) of the alternating current impedance of the cathode slurry for an all-solid-state battery was calculated as a real axis parameter of the obtained alternating current impedance, and the relationship between the processing conditions of the cathode slurry for an all-solid-state battery and the real component (Zre) was investigated. The results are shown in FIG. 4. From the results shown in FIG. 4, it was found that the load intensity and the real component (Zre) showed a proportional relationship where the larger the load intensity, the larger the real component (Zre). From other verification results, it is assumed that this has no direct causal relationship with the coating condition of the solid electrolyte. However, it is assumed that the dispersion state is different in all-solid slurries under different processing conditions, indicating a difference in the dispersion state, and if the real axis parameter is within the predetermined threshold value, the dispersion state can be judged to be good.

The embodiments of the present invention are as explained above; however, the present invention is not limited to those embodiments, and any appropriate modifications and alterations can be made as long as they do not deviate from the essence of the present invention described in the claims.

What is claimed is:

1. A method for evaluating a cathode slurry for an all-solid-state battery, comprising:

measuring an alternating current impedance with respect to a cathode slurry for an all-solid-state battery, in which a cathode active material, a solid electrolyte, a conductive agent and a binder are kneaded and dispersed, and which is sealed in a measurement container provided with electrodes at both ends thereof;

identifying a frequency range from data of the measured alternating current impedance; and evaluating quality of coating condition of the solid electrolyte on the cathode active material, based on an imaginary axis parameter of the alternating current impedance in the identified frequency range and a real axis parameter of the alternating current impedance in the identified frequency range.

2. The method according to claim 1, wherein the imaginary axis parameter of the alternating current impedance is an imaginary component (Zim) of the alternating current impedance of the cathode slurry, or a polarization charge (Cp) derived from the imaginary component (Zim).

3. The method according to claim 1, wherein the real axis parameter of the alternating current impedance is a real number component (Zre) of the alternating current impedance of the cathode slurry.

4. The method according to claim 1, wherein, for identifying the frequency range, the alternating current impedance of the cathode slurry is divided into two or more frequency ranges.

* * * * *